(12) United States Patent
Haible et al.

(10) Patent No.: US 11,913,814 B2
(45) Date of Patent: Feb. 27, 2024

(54) POSITION MEASURING DEVICE

(71) Applicant: DR. JOHANNES HEIDENHAIN GmbH, Traunreut (DE)

(72) Inventors: Pascal Haible, Trostberg (DE); Alois Bartlechner, Palling (DE); Sebastian Gruber, Kirchdorf (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 56 days.

(21) Appl. No.: 17/634,559

(22) PCT Filed: Jul. 8, 2020

(86) PCT No.: PCT/EP2020/069285
§ 371 (c)(1),
(2) Date: Feb. 11, 2022

(87) PCT Pub. No.: WO2021/043469
PCT Pub. Date: Mar. 11, 2021

(65) Prior Publication Data
US 2022/0282999 A1    Sep. 8, 2022

(30) Foreign Application Priority Data
Sep. 4, 2019  (EP) .................................... 19195318

(51) Int. Cl.
*G01D 5/245* (2006.01)
*G01D 5/347* (2006.01)

(52) U.S. Cl.
CPC ......... *G01D 5/2458* (2013.01); *G01D 5/2457* (2013.01); *G01D 5/34792* (2013.01); *G01D 2205/90* (2021.05)

(58) Field of Classification Search
CPC ............... G01D 5/2457; G01D 5/2458; G01D 5/34792; G01D 2205/90
See application file for complete search history.

(56) References Cited

U.S. PATENT DOCUMENTS 5,883,298 A * 3/1999 Holzapfel ............... G01D 18/00
73/1.79
6,031,224 A * 2/2000 Peterlechner .......... G01D 5/366
356/616

(Continued)

FOREIGN PATENT DOCUMENTS

CN    106370213 A    2/2017
CN    109477736 A    3/2019

(Continued)

*Primary Examiner* — Steven L Yeninas
(74) *Attorney, Agent, or Firm* — LEYDIG, VOIT & MAYER, LTD.

(57) ABSTRACT

A position-measuring device includes a carrier body having a first and second measuring graduations and a reference mark. The first and second measuring graduations include graduation structures periodically arranged along first and second measurement directions, respectively, that are perpendicular to each other. The graduation structures of the first measuring graduation each extend parallel to a first direction and the reference mark extends in a second direction that forms an angle different from 0° with the first direction. First and second scanners are configured to scan the first and second measuring graduations and generate first and second scanning signals, respectively. A third scanner is configured to scan the reference mark and generate a reference pulse. The position-measuring device is configured such that a phase angle of the reference pulse is determined as a function of the first scanning signals and the reference pulse.

22 Claims, 7 Drawing Sheets

(56) References Cited

U.S. PATENT DOCUMENTS

| | | | |
|---|---|---|---|
| 2002/0053903 A1 | 5/2002 | Kempe | |
| 2005/0174111 A1 | 8/2005 | Burgschat et al. | |
| 2007/0024280 A1* | 2/2007 | Meyersweissflog | G01D 5/145 |
| | | | 324/252 |
| 2011/0209351 A1* | 9/2011 | Bohm | G01D 5/2457 |
| | | | 33/706 |
| 2014/0103914 A1 | 4/2014 | Kusumi et al. | |
| 2015/0330813 A1* | 11/2015 | Schlichtner | G01D 5/2457 |
| | | | 33/707 |
| 2017/0023383 A1 | 1/2017 | Jordil et al. | |
| 2018/0313671 A1 | 11/2018 | Niiya | |
| 2019/0301900 A1 | 10/2019 | Howley et al. | |
| 2020/0025591 A1 | 1/2020 | Hermann | |

FOREIGN PATENT DOCUMENTS

| | | |
|---|---|---|
| DE | 102004006067 A1 | 8/2005 |
| DE | 102013110808 A1 | 4/2014 |
| DE | 102018108882 A1 | 10/2018 |
| EP | 1202025 A2 | 5/2002 |
| EP | 3527951 A1 | 8/2019 |

\* cited by examiner

POSITION MEASURING DEVICE

CROSS REFERENCE TO RELATED APPLICATIONS

This application is a U.S. National Phase application under 35 U.S.C. § 371 of International Application No. PCT/EP2020/069285, filed on Jul. 8, 2020, and claims benefit to European Patent Application No. EP 19195318.1, filed on Sep. 4, 2019. The International Application was published in German on Mar. 11, 2021 as WO 2021/043469 A1 under PCT Article 21(2).

FIELD

The present invention relates to a position-measuring device as defined in the preamble of claim 1.

BACKGROUND

A position-measuring device of this type is described in DE 10 2018 108 882 A1. In a linear scale, a reference origin mark array and a tilting origin mark array, which is a tilting mark array, are provided in an origin mark region. Since the reference origin mark array is parallel to X-coordinates, an X-direction origin signal is correctly generated. On the other hand, for the Y-direction, in which no origin mark is provided, the distance between a reference origin mark and a tilting origin mark is detected. An absolute Y-direction position is determined based on the distance.

SUMMARY

In an embodiment, the present disclosure provides a position-measuring device including a carrier body having a first measuring graduation, a second measuring graduation, and a reference mark. The first measuring graduation includes a plurality of graduation structures periodically arranged along a first measurement direction. The graduation structures of the first measuring graduation each extend parallel to a first direction. The second measuring graduation includes a plurality of graduation structures periodically arranged along a second measurement direction. The first measurement direction and the second measurement direction are perpendicular to each other. The reference mark extends in a second direction. The first direction and the second direction form an angle different from 0° therebetween. A first scanner is configured to scan the first measuring graduation and generate first scanning signals. A second scanner is configured to scan the second measuring graduation and generate second scanning signals. A third scanner is configured to scan the reference mark and generate a reference pulse. The position-measuring device is configured such that a phase angle of the reference pulse is determined as a function of the first scanning signals and the reference pulse.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
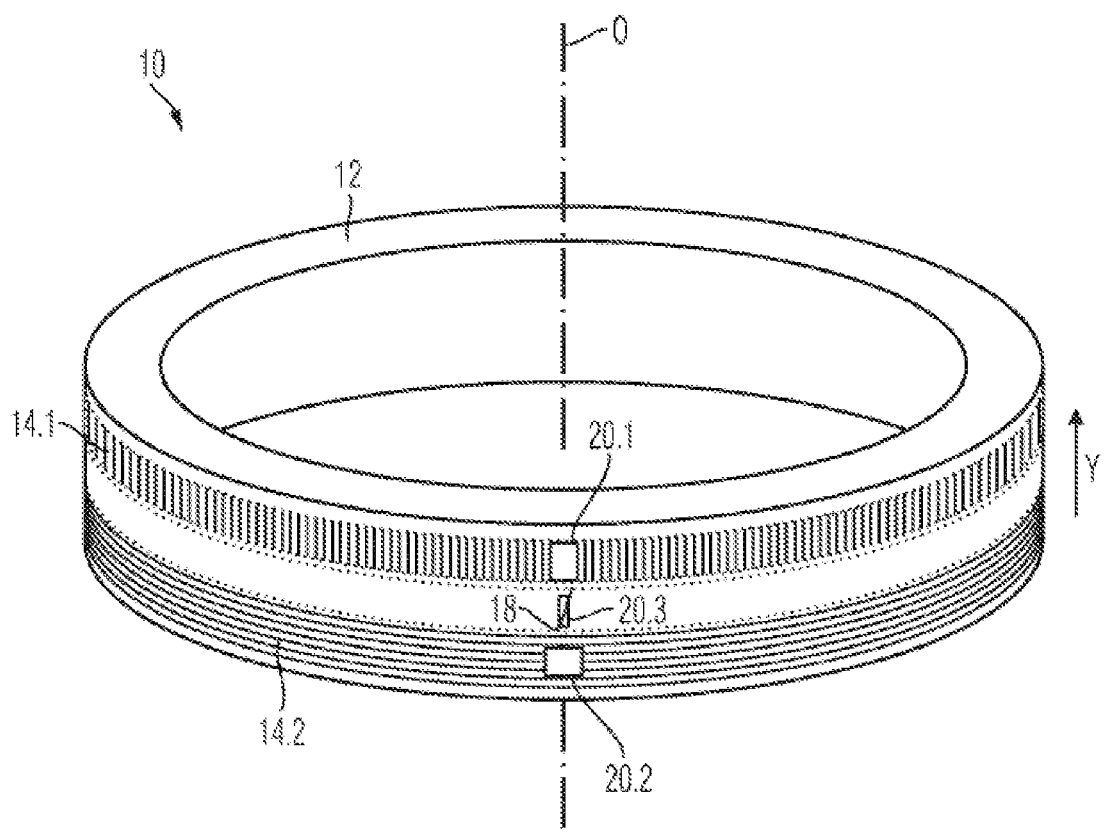
FIG. 1 is a perspective view of an exemplary position-measuring device including a carrier body and a scanning assembly having first through third scanning units (also referred to as scanners)

In an embodiment, the present invention provides a position-measuring device that is simple and compact in construction and capable of precisely determining absolute position information in a further (second) measurement direction perpendicular to a main measurement direction.

The position-measuring device designed in accordance with an embodiment of the present invention includes a carrier body having a first measuring graduation, a second measuring graduation, and a reference mark, and further includes a first scanning unit for scanning the first measuring graduation and for generating first scanning signals, a second scanning unit for scanning the second measuring graduation and for generating second scanning signals, and a third scanning unit for scanning the reference mark and for generating a reference pulse. The first measuring graduation includes a plurality of graduation structures periodically arranged along a first measurement direction (main measurement direction). The graduation structures of the first measuring graduation each extend parallel to a first direction. The second measuring graduation includes a plurality of graduation structures periodically arranged along a second measurement direction. The first measurement direction and the second measurement direction are perpendicular to each other. The reference mark extends in a second direction. The first direction and the second direction form an angle different from 0° therebetween. The position-measuring device is configured such that a phase angle of the reference pulse is determined as a function of the first scanning signals and the reference pulse.

Preferably, the phase angle of the reference pulse represents absolute position information in the second measurement direction.

It is advantageous if the phase angle of the reference pulse is defined relative to a reference phase angle determined by the first scanning signals and is in a range of −90° to +90°, preferably in the range of −60° to +60°.

Preferably, the reference phase angle corresponds to a position of the waveform of the first scanning signals at which the first scanning signals have positive values and the same instantaneous value.

The reference phase angle is in particular within a signal period of the first scanning signals which is determined by the reference pulse.

Advantageously, the reference mark does not have a reference mark structure extending in the first direction, in particular parallel to the second measurement direction.

Preferably, the first measuring graduation and the reference mark are disposed adjacent one another along the second measurement direction. The second measuring graduation and the reference mark are disposed, for example, adjacent one another along the second measurement direction.

Alternatively, the reference mark may be a reference mark that is integrated into the first measuring graduation or into the second measuring graduation.

Preferably, the first through third scanning units are scanning units which are integrated into a common scanning head unit. The position-measuring device is in particular configured to determine the absolute position information in the second measurement direction without any relative movement occurring between the scanning head unit and the carrier body in the second measurement direction. This eliminates the need for the scanning head unit to move relative to the carrier body in the second measurement direction to enable establishing an absolute reference for the second measuring graduation in the second measurement direction.

The first measuring graduation and the second measuring graduation are in particular incremental graduations.

The first scanning signals may have a signal period determined by the first measuring graduation. The second scanning signals may have a signal period determined by the second measuring graduation. The signal period of the first scanning signals and the signal period of the second scanning signals are, for example, equal.

Preferably, the first scanning signals and the second scanning signals are two sinusoidal and phase-shifted periodic scanning signals, respectively, in particular two respective scanning signals which are phase-shifted by 90° with respect to each other.

Absolute position information in the second measurement direction is in particular understood to be a first absolute position in the second measurement direction and/or a second absolute position in the second measurement direction. The first absolute position in the second measurement direction may also be referred to as a coarse absolute position in the second measurement direction. The second absolute position in the second measurement direction may also be referred to as a fine absolute position in the second measurement direction.

The graduation structures of the first measuring graduation and the graduation structures of the second measuring graduation each include in particular graduation lines. The graduation lines may have identical widths and be continuous along their extent. Alternatively, the graduation lines may be interrupted along their extent, for example to produce an integrated reference mark extending over a plurality of graduation lines.

Embodiments of the invention enable absolute position information in the second measurement direction to be precisely determined utilizing a tilt of a reference mark. "Tilt" means that the reference mark is aligned or oriented differently than the graduation structures of the first measuring graduation. The reference mark serves, on the one hand, to establish an absolute reference for the first measuring graduation in the first measurement direction. On the other hand, the reference mark serves to establish an absolute reference for the second measuring graduation in the second measurement direction. This eliminates the need for an additional means for establishing an absolute reference for the second measuring graduation in the second measurement direction, in particular an additional reference mark or an absolute graduation, for example in the form of a pseudo-random code. This in turn allows for a simple and compact design as well as a reduction in the complexity of the scanning.

It is an advantage of an embodiment the invention that the reference mark signal (i.e., the reference pulse obtained by scanning the reference mark) remains usable or compatible for analyzing a relative or absolute position in the first measurement direction.

Other details and advantages of embodiments of the present invention will become apparent from the following description of possible embodiments of the invention, taken in conjunction with the figures.

In the figures, like or functionally like elements are denoted by like reference numerals.

Figure 2A:
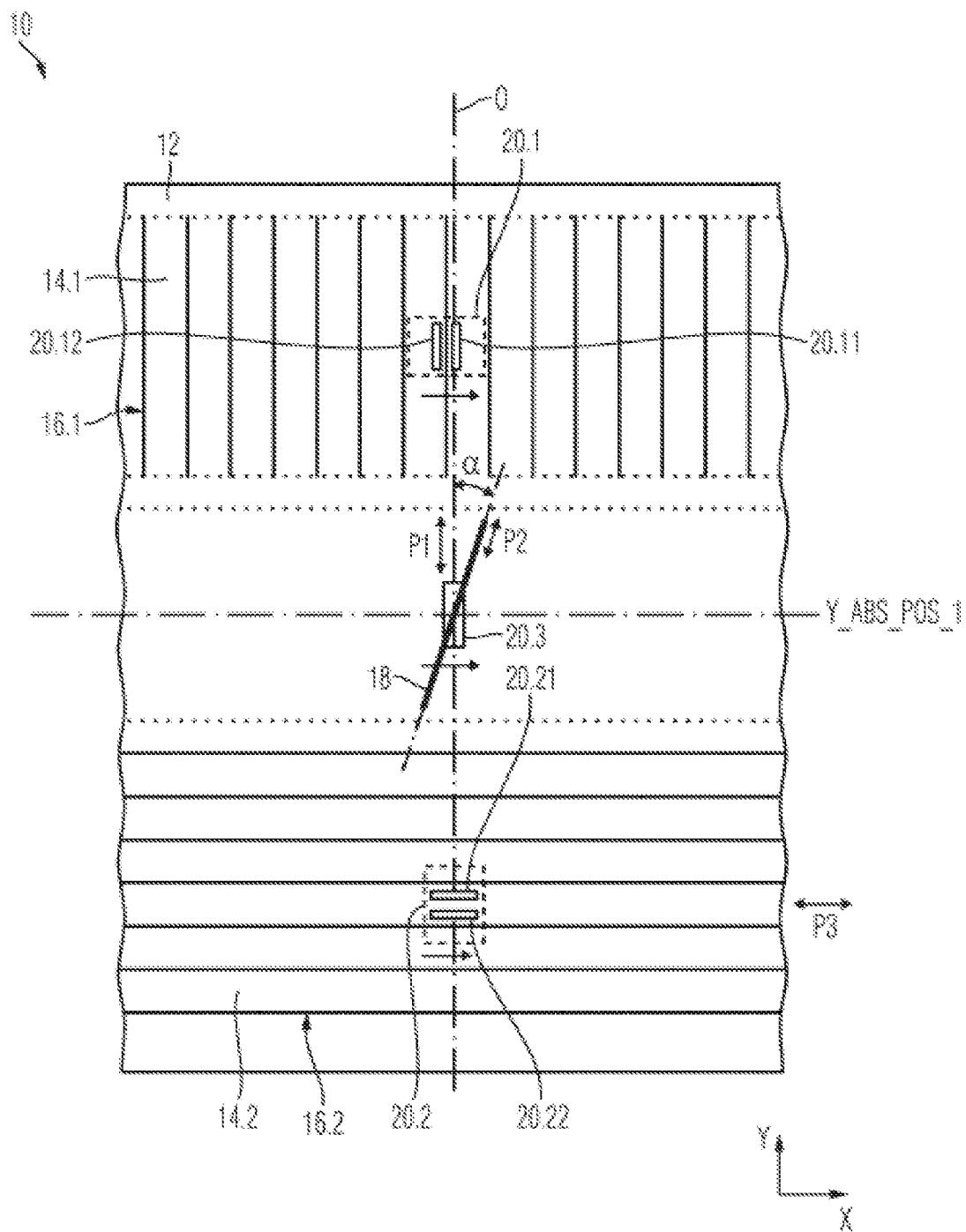
FIG. 2A is a view showing a detail of the position-measuring device of FIG. 1 in the region of the scanning assembly in a first state.
Figure 2B:
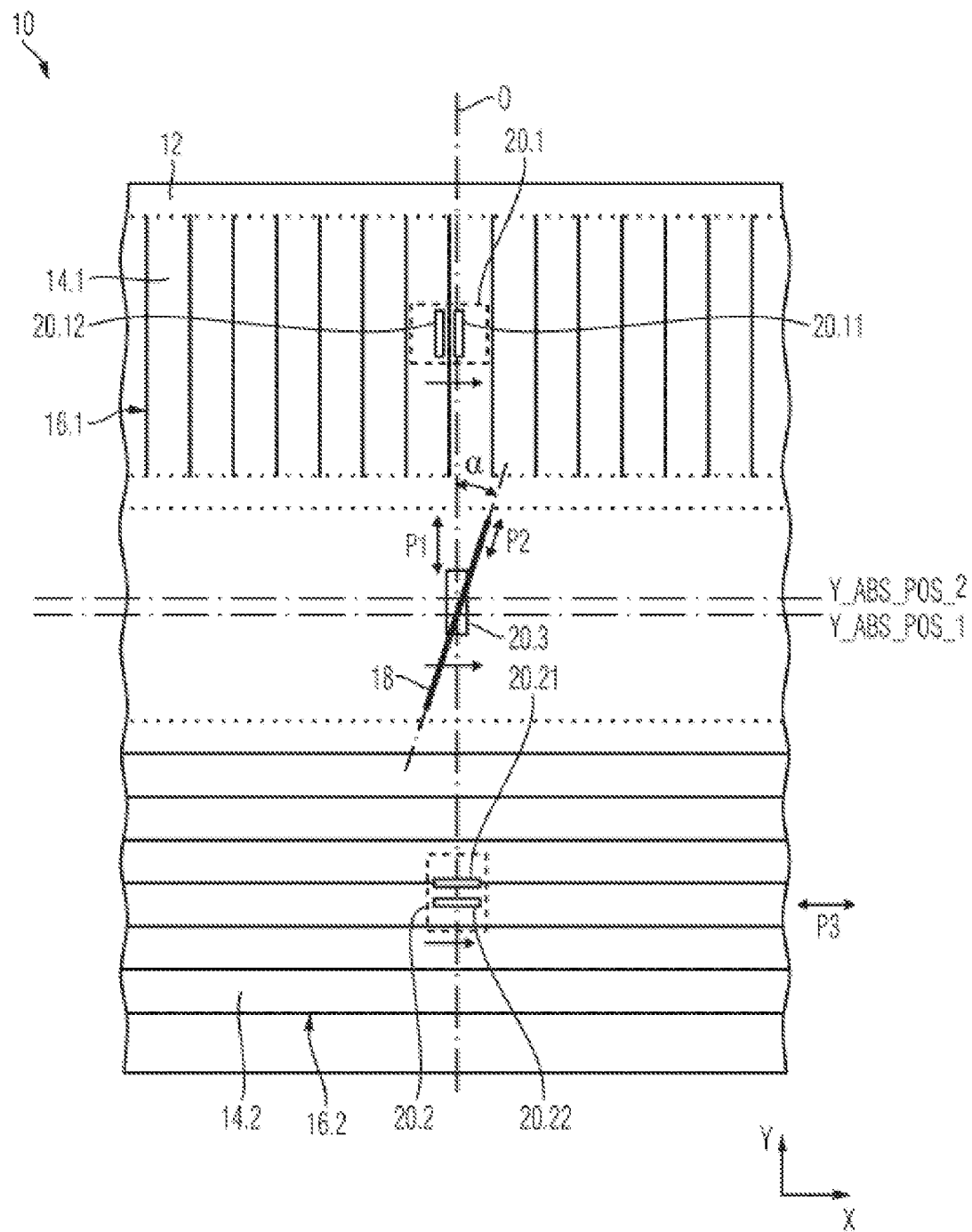
FIG. 2B is a view showing a detail of the position-measuring device of FIG. 1 in the region of the scanning assembly in a second state.

An exemplary position-measuring device 10 is shown in FIGS. 1 and 2A, 2B. Position-measuring device 10 serves to measure the relative position of two relatively movable objects in a first measurement direction X and in a second measurement direction Y. First measurement direction X corresponds to a tangential direction defined with respect to a reference axis O. Second measurement direction Y corresponds to a direction parallel to a reference axis O. First measurement direction X may also be referred to as a circumferential direction. Second measurement direction Y may also be referred to as an axial direction. First measurement direction X is the main measurement direction.

Position-measuring device 10 includes a carrier body 12 and a scanning assembly having first through third scanning units 20.1 through 20.3. Carrier body 12 has a first measuring graduation 14.1, a second measuring graduation 14.2, and a reference mark 18. First scanning unit 20.1 is used for scanning first measuring graduation 14.1 and for generating first scanning signals. Second scanning unit 20.2 is used for scanning second measuring graduation 14.2 and for generating second scanning signals. Third scanning unit 20.3 is used for scanning reference mark 18 and for generating a reference pulse. First through third scanning units 20.1 through 20.3 are movably disposed relative to carrier body 12 so as to allow scanning of first and second measuring graduations 14.1, 14.2 and of reference mark 18. Preferably, first through third scanning units 20.1 through 20.3 are mounted to a common holder so that they can be moved together relative to carrier body 12.

As illustrated in FIG. 1, first measuring graduation 14.1 and reference mark 18 are disposed adjacent one another along second measurement direction Y. Furthermore, second measuring graduation 14.2 and reference mark 18 are disposed adjacent one another along second measurement direction Y. That is, reference mark 18 is disposed in second measurement direction Y between first and second measuring graduations 14.1, 14.2. Conjoint movement of first through third scanning units 20.1 through 20.3 relative to carrier body 12 in first measurement direction X is indicated in FIGS. 2A, 2B by arrows.

FIGS. 2A, 2B show first through third directions P1 through P3. First direction P1 is perpendicular to first measurement direction X. Third direction P3 is perpendicular to second measurement direction Y. First and second measurement directions X, Y are perpendicular to each other (see the X-Y coordinate system of FIGS. 2A, 2B). As illustrated in FIGS. 2A, 2B, first measuring graduation 14.1 includes a plurality of graduation structures 16.1 periodically arranged along first measurement direction X. Graduation structures 16.1 of first measuring graduation 14.1 each extend parallel to first direction P1. Second measuring graduation 14.2 includes a plurality of graduation structures 16.2 periodically arranged along second measurement direction Y. Graduation structures 16.2 of second measuring graduation 14.2 each extend parallel to third direction P3. Reference mark 18 extends in second direction P2. First direction P1 and second direction P2 form an angle α different from 0° therebetween. In particular, second direction P2 is not parallel to second measurement direction Y. Angle α is preferably greater than 0° and less than 90°.

First and second measuring graduations 14.1, 14.2 are in particular incremental graduations. The graduation period of first measuring graduation 14.1 and the graduation period of second measuring graduation 14.2 are, for example, equal. The first scanning signals have a signal period determined by first measuring graduation 14.1. The second scanning signals have a signal period determined by second measuring graduation 14.2. If the graduation period of first measuring graduation 14.1 and the graduation period of second measuring graduation 14.2 are equal, the signal period of the first scanning signals and the signal period of the second scanning signals are also equal.

Preferably, reference mark 18 has only one reference mark structure. Alternatively, a plurality of distance-coded reference mark structures may be provided.

First scanning unit 20.1 includes a first sensor 20.11 and a second sensor 20.12. Second scanning unit 20.1 includes a first sensor 20.21 and a second sensor 20.22. The two sensors 20.11, 20.12 of first scanning unit 20.1 are used to generate two sinusoidal and phase-shifted periodic scanning signals, which constitute the first scanning signals. The two sensors 20.21, 20.22 of second scanning unit 20.2 are used to generate two sinusoidal and phase-shifted periodic scanning signals, which constitute the second scanning signals. Third scanning unit 20.3 includes a single sensor for generating the reference pulse.

When relative movement occurs between first through third scanning units 20.1 through 20.3 and carrier body 12 in second measurement direction Y; i.e., parallel to reference axis O, then, in particular, the reference pulse generated by third scanning unit 20.3 (i.e., its phase angle) changes. In FIG. 2A, first through third scanning units 20.1 through 20.3 are shown in a first state; i.e., a state in which they are not displaced in second measurement direction Y. This first state corresponds to an initial state (or reference state). The first state is associated with a first measured value (Y_ABS_POS_1) of a high-resolution absolute position to be determined in second measurement direction Y (Y_ABS_POS). For first measured value Y_ABS_POS_1, it holds for example that Y_ABS_POS_1=0. In FIG. 2B, first through third scanning units 20.1 through 20.3 are shown in a second state; i.e., a state in which they are displaced in second measurement direction Y. The second state is associated with a second measured value (Y_ABS_POS_2) of a high-resolution absolute position to be determined in second measurement direction Y (Y_ABS_POS). For second measured value Y_ABS_POS_2, it holds for example that Y_ABS_POS_2>0. The determination of Y_ABS_POS is explained in more detail in particular in connection with FIG. 7.

Figure 3:
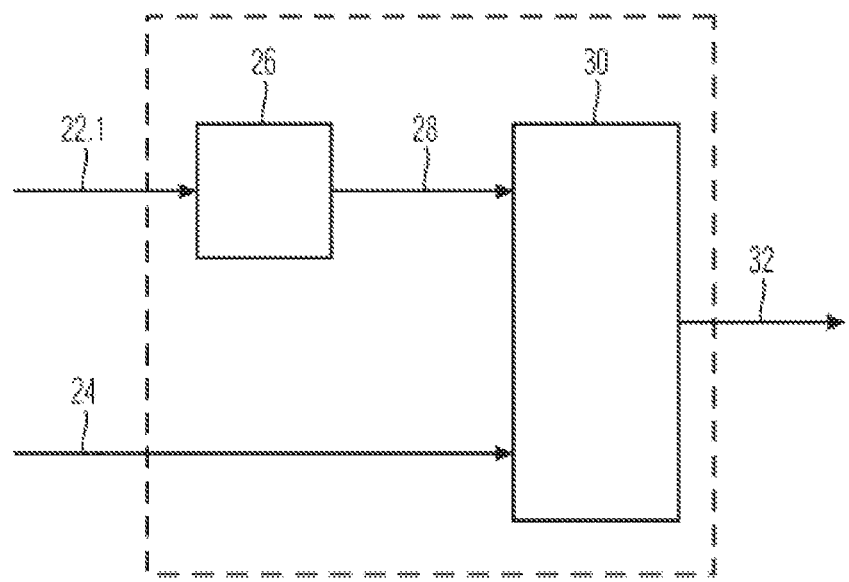
FIG. 3 is a block diagram of an exemplary analysis unit of the position-measuring device, which analysis unit has a unit for determining a phase angle of a reference pulse.
Figure 4:
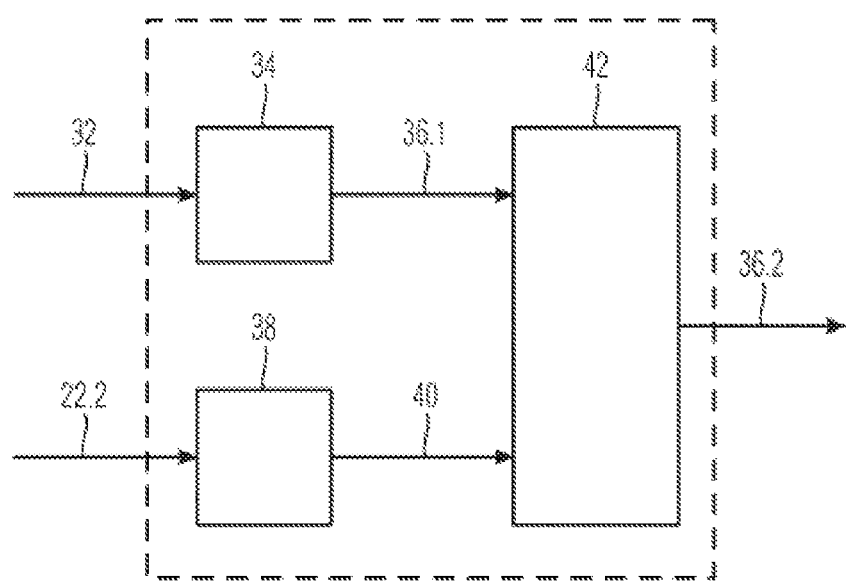
FIG. 4 is a block diagram of an exemplary analysis unit of the position-measuring device, which analysis unit has a unit for determining a first absolute position and a unit for determining a second absolute position.

FIGS. 3 and 4 show block diagrams of exemplary analysis units of position-measuring device 10.

The analysis unit according to FIG. 3 includes a unit 26 for determining a phase signal and a unit 30 for determining a phase angle of the reference pulse 24. Unit 26 is configured to receive first scanning signals 22.1 and to generate a phase signal 28. Unit 30 is configured to determine a phase angle 32 of reference pulse 24 as a function of phase signal 28 and reference pulse 24. Blocks (units) 26, 30 form a unit. This unit is configured to determine phase angle 32 of reference pulse 24 as a function of first scanning signals 22.1 and reference pulse 24.

The analysis unit according to FIG. 4 includes a unit 34 for determining a first absolute position, a unit 38 for determining a relative position, and a unit 42 for determining a second absolute position. Unit 34 is configured to determine a first absolute position 36.1 in second measurement direction Y as a function of phase angle 32 of reference pulse 24. Unit 38 is configured to determine a relative position 40 in second measurement direction Y as a function of second scanning signals 22.2. Unit 42 is configured to determine a second absolute position 36.2 in second measurement direction Y as a function of first absolute position 36.1 and relative position 40.

Blocks (units) 34, 38 and 42 form a unit. This unit is configured to determine second absolute position 36.2 in second measurement direction Y as a function of phase angle 32 of reference pulse 24 and second scanning signals 22.2.

Figure 5:
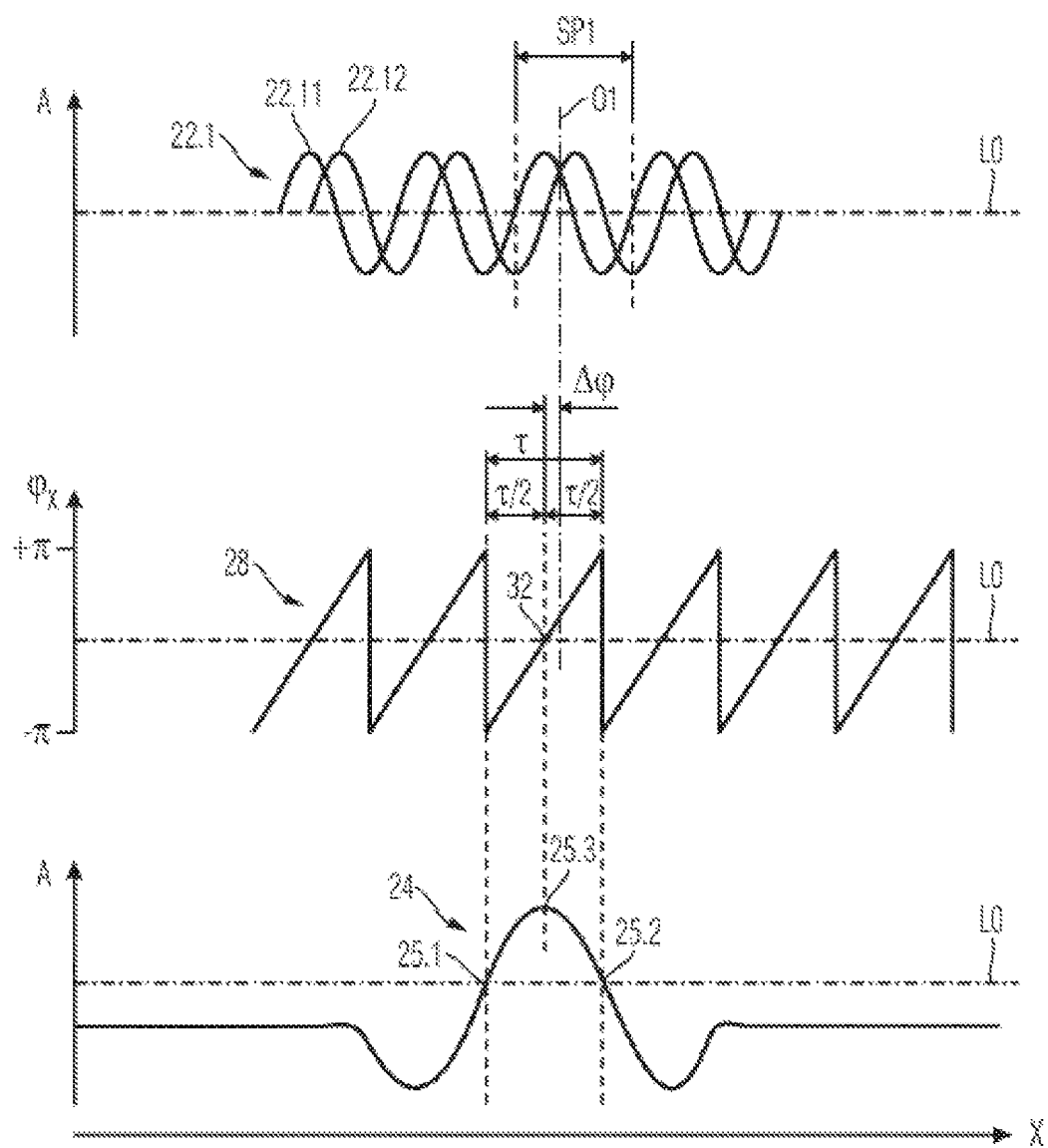
FIG. 5 is a view showing exemplary waveforms of signals which are processed in the analysis unit of FIG. 3.

FIG. 5 shows exemplary waveforms of signals 22.1, 24, 28, which are processed in the analysis unit of FIG. 3. In the upper portion of FIG. 5, first scanning signals 22.1 (signal amplitude A) are shown as function of position (X-position). The zero line is denoted as L0 in the upper portion of FIG. 5. In the middle portion of FIG. 5, phase signal 28 (phase signal value $\varphi_x$) is shown as function of position (X-position). The zero line is denoted as L0 in the middle portion of FIG. 5. In the lower portion of FIG. 5, reference pulse 24 (signal amplitude A) is shown as function of position (X-position). The zero line is denoted as L0 in the lower portion of FIG. 5.

First scanning signals 22.1 include a first signal 22.11 generated by first sensor 20.11 of first scanning unit 20.1 and a second signal 22.12 generated by second sensor 20.12 of first scanning unit 20.1. The two signals 22.11, 22.12 are each sinusoidal and are phase-shifted relative to each other by 90°. Furthermore, the two signals 22.11, 22.12 have the same signal period. The signal period of first scanning signals 22.1 is denoted as SP1. Reference phase angle O1 corresponds to a position of the waveform of first scanning signals 22.1 at which first scanning signals 22.1 have positive values and the same instantaneous value. Phase signal 28 is a signal that is derived from first scanning signals 22.1 using, for example, a trigonometric function. Phase signal 28 has the same signal period as first scanning signals 22.1. Reference pulse 24 has two zero crossings 25.1, 25.2 and a maximum 25.3. Reference pulse 24 has, for example, a symmetrical shape. The width of reference pulse 24 is defined by the two zero crossings 25.1, 25.2 and denoted as τ. Maximum 25.3 is located, for example, in the middle between the two zero crossings 25.1, 25.2. Phase angle 32 of reference pulse 24, illustrated in FIG. 5, corresponds to a phase angle that is obtained, for example, by in-phase averaging of phase signal values $\varphi_x$ at the X-positions of the two zero crossings 25.1, 25.2. FIG. 5 further shows the phase difference $\Delta\varphi$ between phase angle 32 of reference pulse 24 and reference phase angle O1.

As illustrated in FIG. 5, reference pulse 24 is associated with a specific signal period (signal period SP1) of first scanning signals 22.1. Phase angle 32 of reference pulse 24 is defined relative to the reference phase angle O1 determined by first scanning signals 22.1 and is in a range of −90° to +90°, preferably in the range of −60° to +60°. Width τ of reference pulse 24 in relation to first scanning signals 22.1; i.e., in relation to signal period SP1, is in a range of 180° to 540°, preferably in the range of 300° to 420°.

Figure 6:
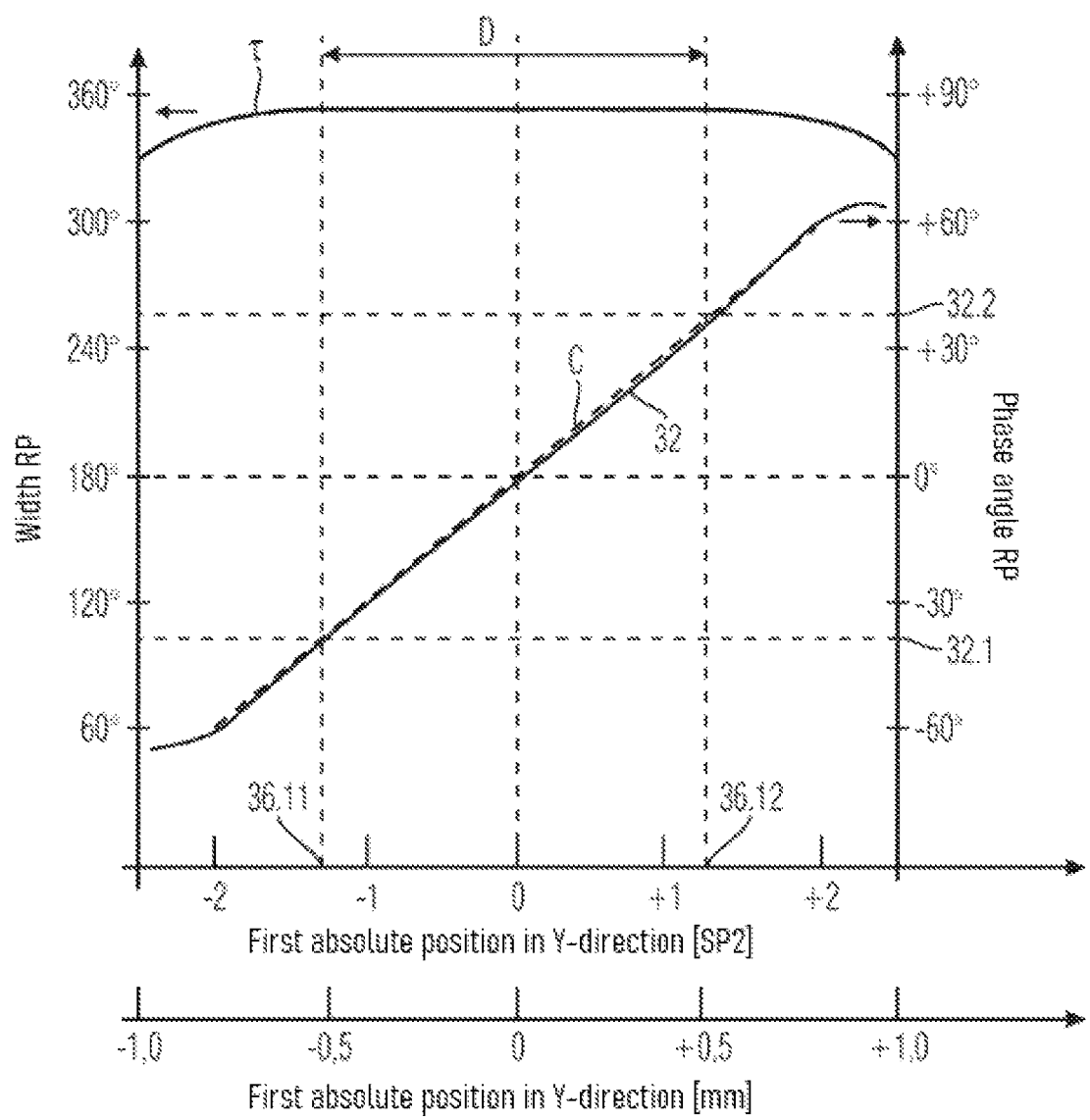
FIG. 6 is a schematic view illustrating an exemplary linear relationship between a first absolute position and a phase angle of a reference pulse.

FIG. 6 shows a schematic view illustrating an exemplary linear relationship C. On the one hand, width τ of reference pulse (RP) 24 is plotted in FIG. 6 as a function of first absolute position 36.1 in second measurement direction Y (in signal periods SP2 of second scanning signals 22.2 and in millimeters). On the other hand, phase angle 32 of reference pulse 24 is plotted in FIG. 6 as a function of first absolute position 36.1 in second measurement direction Y (in signal periods SP2 of second scanning signals 22.2 and in millimeters). The curve shown in FIG. 6 for phase angle 32 of reference pulse 24 corresponds to a previously determined curve of measured values. Linear relationship C corresponds to a linear approximation of this curve of measured values.

As illustrated in FIG. 6, phase angle 32 of reference pulse 24 is in a range defined by a first threshold 32.1 and a second threshold 32.2. First threshold 32.1 is associated with a minimum 36.11 of a first absolute position 36.1 to be determined in second measurement direction Y as a function of phase angle 32 of reference pulse 24. Second threshold 32.2 is associated with a maximum 36.12 of a first absolute position 36.1 to be determined in second measurement direction Y as a function of phase angle 32 of reference pulse 24. Minimum 36.11 and maximum 36.12 define a permissible range D for the determination of first absolute position 36.1 in second measurement direction Y. Permissible range D corresponds to a number of signal periods SP2 of second scanning signals 22.2. This number is in particular in a range of 2 to 10 (e.g., 2.5 in the example of FIG. 6).

Width τ of reference pulse 24 is substantially constant within permissible range D. This may be utilized for checking the quality of the reference pulse 24 generated by third scanning unit 20.3.

Knowing linear relationship C, a predetermined association rule is provided for associating phase angle 32 of reference pulse 24 with first absolute position 36.1 in second measurement direction Y. Furthermore, knowing linear relationship C, a predetermined conversion factor can be obtained (e.g., 1/RMSPSP, where RMSPSP is the slope of straight line C). Position-measuring device 10 may be, on the one hand, be configured such that first absolute position 36.1 in second measurement direction Y is determined utilizing the aforementioned predetermined association rule. On the other hand, position-measuring device 10 may be configured such that first absolute position 36.1 in second measurement direction Y is determined utilizing the aforementioned predetermined conversion factor.

Referring to FIG. 6, phase angle 32 of reference pulse 24 is in particular given by a linear relationship C. Linear relationship C is defined by a slope RMSPSP ("reference mark shift per signal period"). This slope RMSPSP is at least 5° per signal period SP2 of second scanning signals 22.2, preferably 20° or 30° per signal period SP2 of second scanning signals 22.2.

Figure 7:
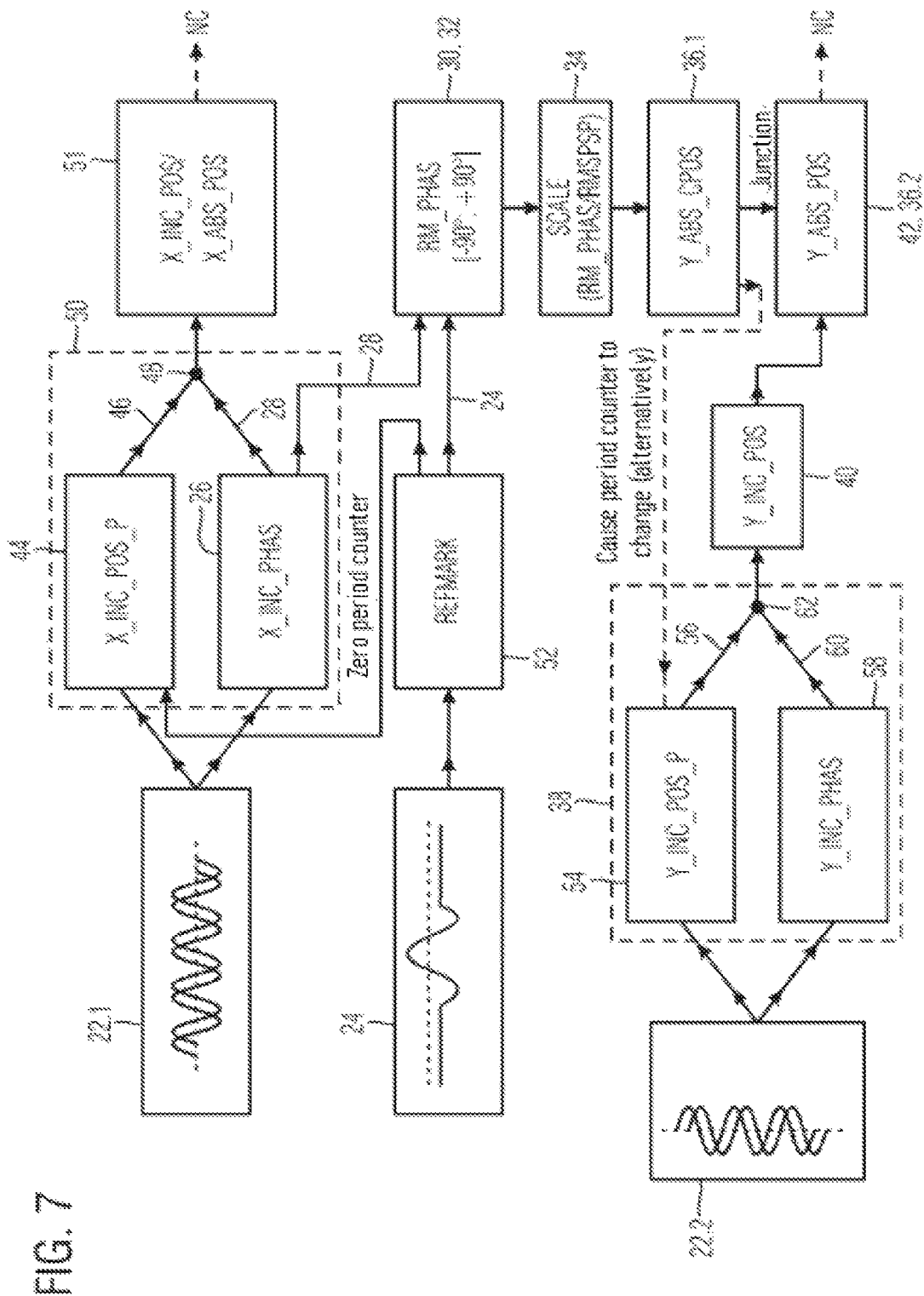
FIG. 7 is a block diagram of an exemplary signal-processing unit of the position-measuring device.

FIG. 7 shows a block diagram of an exemplary signal-processing unit of position-measuring device 10. In the block diagram of FIG. 7, first scanning signals 22.1, reference pulse 24, and second scanning signals 22.2 are shown as input signals. The signal-processing unit according to FIG. 7 includes a unit 50 for determining a relative or absolute position, a unit 52 (REFMARK) for detecting a reference pulse and for setting a period counter, and a unit 38 for determining a relative position. Unit 50 includes a period counter 44 (X_INC_POS_P) and the unit 26 for determining a phase signal (X_INC_PHAS). Unit 38 includes a period counter 54 (Y_INC_POS_P) and a unit 58 for determining a phase signal (Y_INC_PHAS). Unit 50 is configured to determine a relative or absolute position 51 (X_INC_POS/X_ABS_POS) as a function of first scanning signals 22.1. Unit 52 is configured, on the one hand, to cause period counter 44 to be zeroed depending on reference pulse 24. On the other hand, unit 52 is configured to forward reference pulse 24 to unit 30. Unit 38 is configured to determine a relative position 40 (Y_INC_POS) as a function of second scanning signals 22.2. Relative or absolute position 51 corresponds to a relative or absolute position in first measurement direction X. Relative position 40 corresponds to a relative position in second measurement direction Y.

Period counter 44 is configured to provide a coarse-resolution relative or absolute position in first measurement direction X at output 46 by counting signal periods of first scanning signals 22.1. When period counter 44 is zeroed, an absolute reference is established in first measurement direction X (referencing). Prior to referencing, the coarse-resolution relative position is provided at output 46. Subsequent to referencing, the coarse-resolution absolute position is provided at output 46. Unit 50 further includes a combinational logic unit (node 48). The combinational logic unit is configured to combine the relative or absolute position at output 46 with the phase signal 28 generated by unit 26 to obtain the (fine-resolution) relative or absolute position 51. This relative or absolute position 51 may be forwarded through an interface to subsequent electronics (NC).

Period counter 54 is configured to provide a coarse-resolution relative position in second measurement direction Y at output 56 by counting signal periods of second scanning signals 22.2. Unit 38 further includes a combinational logic unit (node 62). The combinational logic unit is configured to combine the relative position at output 56 with the phase signal 60 generated by unit 58 to obtain the (fine-resolution) relative position 40. This relative position 40 in second measurement direction Y may be combined with first absolute position 36.1 in second measurement direction Y (Y_ABS_CPOS) to obtain second absolute position 36.2 in second measurement direction Y (Y_ABS_POS). The combination performed by unit 42 to obtain second absolute position 36.2 is also referred to as "connection." Second absolute position 36.2 in second measurement direction Y may be forwarded through an interface to subsequent electronics (NC).

Alternatively, the connection may also be effected by causing a change in period counter 54 (see dashed line from block 36.1 to block 54 in FIG. 7).

Referring to FIG. 7, position-measuring device 10 may be configured such that second absolute position 36.2 in second measurement direction Y is determined as a function of the phase signal 60 derived from second scanning signals 22.2. Furthermore, position-measuring device 10 may be configured such that relative position 40 in second measurement direction Y is determined as a function of second scanning signals 22.2, and that relative position 40 in second measurement direction Y is combined with first absolute position 36.1 in second measurement direction Y to obtain second absolute position 36.2 in second measurement direction Y.

Position-measuring device 10 is in particular configured such that the determination of first absolute position 36.1 in second measurement direction Y is performed with a first resolution, and that the determination of second absolute position 36.2 in second measurement direction Y is performed with a second resolution, the first resolution being lower than the second resolution. This is achieved by the previously mentioned connection.

Also referring to FIG. 7, unit 30 is configured to determine phase angle 32 of reference pulse 24 (RM_PHAS) as a function of the phase signal 28 generated by unit 26 and reference pulse 24. Unit 34 (SCALE) is configured to determine first absolute position 36.1 in second measurement direction Y by applying the predetermined conversion factor (i.e., 1/RMSPSP), for example using the following rule:

$$Y\_ABS\_CPOS = RM\_PHAS \times 1/RMSPSP$$

Position-measuring device 10 is suitable in particular for use in a spindle. Preferably, first and second measuring graduations 14.1, 14.2 and reference mark 18 are designed to be scannable magnetically.

Alternatively, first and second measuring graduations 14.1, 14.2 and reference mark 18 may be designed to be scannable optically, inductively or capacitively.

The invention is not limited to rotary position-measuring devices. The position-measuring device of the invention may also be a linear position-measuring device.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A position-measuring device comprising:
a carrier body having a first measuring graduation, a second measuring graduation, and a reference mark, the first measuring graduation including a plurality of graduation structures periodically arranged along a first measurement direction, the graduation structures of the first measuring graduation each extending parallel to a first direction, the second measuring graduation including a plurality of graduation structures periodically arranged along a second measurement direction, the first measurement direction and the second measurement direction being perpendicular to each other, and the reference mark extending in a second direction, the first direction and the second direction forming an angle different from 0° therebetween;
a first scanner configured to scan the first measuring graduation and generate first scanning signals;
a second scanner configured to scan the second measuring graduation and generate second scanning signals; and
a third scanner configured to scan the reference mark and generate a reference pulse,
wherein the position-measuring device is configured such that a phase angle of the reference pulse is determined as a function of the first scanning signals and the reference pulse.

2. The position-measuring device as recited in claim 1, wherein the position-measuring device is configured such that a first absolute position in the second measurement direction is determined as a function of the phase angle of the reference pulse.

3. The position-measuring device as recited in claim 2, wherein the position-measuring device is configured such that the first absolute position in the second measurement direction is determined utilizing a predetermined association rule for associating the phase angle of the reference pulse with the first absolute position in the second measurement direction.

4. The position-measuring device as recited in claim 2, wherein the position-measuring device is configured such that the first absolute position in the second measurement direction is determined utilizing a predetermined conversion factor.

5. The position-measuring device as recited in claim 1, wherein the position-measuring device is configured such that the phase angle of the reference pulse is determined as a function of a phase signal derived from the first scanning signals.

6. The position-measuring device as recited in claim 2, wherein the position-measuring device is configured such that a second absolute position in the second measurement direction is determined as a function of the phase angle of the reference pulse and the second scanning signals.

7. The position-measuring device as recited in claim 6, wherein the position-measuring device is configured such that the determination of the first absolute position in the second measurement direction is performed with a first resolution, and that the determination of the second absolute position in the second measurement direction is performed with a second resolution, the first resolution being lower than the second resolution.

8. The position-measuring device as recited in claim 6, wherein the position-measuring device is configured such that the second absolute position in the second measurement direction is determined as a function of a phase signal derived from the second scanning signals.

9. The position-measuring device as recited in claim 6, wherein the position-measuring device is configured such that a relative position in the second measurement direction is determined as a function of the second scanning signals, and such that the relative position in the second measurement direction is combined with the first absolute position in the second measurement direction to obtain the second absolute position in the second measurement direction.

10. The position-measuring device as recited in claim 1, wherein the phase angle of the reference pulse is defined relative to a reference phase angle determined by the first scanning signals and is in a range of −90° to +90°.

11. The position-measuring device as recited in claim 1, wherein the phase angle of the reference pulse is in a range defined by a first threshold and a second threshold, wherein the first threshold is associated with a minimum of a first absolute position to be determined in the second measurement direction as a function of the phase angle of the reference pulse, wherein the second threshold is associated with a maximum of the first absolute position.1) to be determined in the second measurement direction, wherein the minimum and the maximum define a permissible range for the determination of the first absolute position in the second measurement direction, wherein the permissible range corresponds to a number of signal periods of the second scanning signals, and wherein the number of signal periods is in a range of 2 to 10.

12. The position-measuring device as recited in claim 1, wherein the phase angle of the reference pulse is given by a linear relationship that is defined by a slope, the slope being at least 5° per signal period of the second scanning signals.

13. The position-measuring device as recited in claim 1, wherein a width of the reference pulse in relation to the first scanning signals is in a range of 180° to 540°.

14. The position-measuring device as recited in claim 1, wherein the first direction is perpendicular to the first measurement direction.

15. The position-measuring device as recited in claim 1, wherein the graduation structures of the second measuring graduation each extend parallel to a third direction, the third direction being perpendicular to the second measurement direction.

16. The position-measuring device as recited in claim 10, wherein the phase angle is in a range of −60° to +60°.

17. The position-measuring device as recited in claim 12, wherein the slope is 20° or 30° per signal period of the second scanning signals.

18. The position-measuring device as recited in claim 13, wherein the width of the reference pulse in relation to the first scanning signals is in a range of 300° to 420°.

19. The position-measuring device as recited in claim 2, wherein the first absolute position in the second measurement direction is determinable from the reference mark alone without using a further reference mark having a different orientation than the reference mark.

20. The position-measuring device as recited in claim 19, wherein the graduation structures of the second measuring graduation extend in a third direction, and wherein the reference mark is tilted relative to both the first direction and the third direction.

21. The position-measuring device as recited in claim 19, wherein the reference mark includes only a single reference mark structure that is tilted relative to the first and second measuring graduations.

22. A method for operating a position-measuring device comprising a carrier body having a first measuring graduation, a second measuring graduation, and a reference mark, the first measuring graduation including a plurality of graduation structures periodically arranged along a first measurement direction, the graduation structures of the first measuring graduation each extending parallel to a first direction, the second measuring graduation including a plurality of graduation structures periodically arranged along a second measurement direction, the first measurement direction and the second measurement direction being perpendicular to each other, and the reference mark extending in a second direction, the first direction and the second direction forming an angle different from 0° therebetween, the method comprising:

scanning the first measuring graduation and generating first scanning signals;

scanning the second measuring graduation and generating second scanning signals;

scanning the reference mark and generating a reference pulse; and determining a phase angle of the reference pulse as a function of the first scanning signals and the reference pulse.

\* \* \* \* \*